June 13, 1961  A. W. MUSGRAVE  2,988,729
PRODUCTION OF SEISMIC RECORD SECTIONS
Filed March 1, 1957  3 Sheets-Sheet 1

June 13, 1961   A. W. MUSGRAVE   2,988,729
PRODUCTION OF SEISMIC RECORD SECTIONS
Filed March 1, 1957   3 Sheets—Sheet 3

United States Patent Office 2,988,729
Patented June 13, 1961

2,988,729
PRODUCTION OF SEISMIC RECORD SECTIONS
Albert W. Musgrave, Dallas, Tex., assignor, by mesne assignments, to Socony Mobil Oil Company, Inc., New York, N.Y., a corporation of New York
Filed Mar. 1, 1957, Ser. No. 643,279
2 Claims. (Cl. 340—15)

This invention relates to the production of seismic record sections and more particularly to a method for recording seismograms in such a manner that a seismic record section may be formed by placing a plurality of individual seismograms in side-by-side relation while maintaining a lateral spacing between recorded signals accurately representative of the lateral spacing along the traverse of related seismic detecting stations.

In a more specific aspect the invention relates to the recording of seismic signals reflected from points on a subsurface interface on a first seismogram adjacent one margin thereof on an amplitude selective basis and recording in entirety signals reflected from the same points on a second seismogram adjacent a different margin.

In seismic exploration large areas are often covered by continuous profiling. Such a program involves establishing seismic shot points and detecting stations at substantially uniform spaced points along a line that may extend for miles across a given geological province. Seismic records produced in photographic form by conventional seismic recording equipment may include several dozen traces. In any case the number of signal traces on a given seismogram may be less than the total number of observations to be made along a given traverse. It is desirable, in order to gain a perspective and also in detailed studies, to be able to form record sections by placing all of the records obtained along a given profile in side-by-side relation. Record sections so formed may be studied in full size or may be photographically reduced in size to portray the seismic character of the subsurface formations underlying the traverse. Where the traces on photographic paper are representative of earth movement at a given detecting station, trace deflections or excursions are permitted for high energy waves in order to provide amplitude contrast with low energy waves. Ordinarily the top and bottom traces on a given seismogram are spaced a substantial distance from the margin of the recording paper in order fully to record the excursions of signals represented by the top and bottom traces. The traces on a seismogram may be spaced one from the other in such a manner that they represent in a general sense spacing between points on a subsurface horizon from which seismic waves are reflected back to the surface for detection. This spacing may or may not correspond with spacings between detecting stations along a traverse.

The length of the seismogram generally corresponds to travel time of seismic waves. When suitably calibrated the length of a seismogram may correspond to depth. In either case the seismogram may be viewed as a scaled representation of earth structure. If two conventional seismograms are placed side by side, the scaled representation is discontinuous at the contiguous margins because of the necessity of leaving a space on each record between the top and bottom traces and adjacent margins thereof.

The present invention provides a method for recording seismic data such that a continuous presentation may be provided in seismic record sections made up of a plurality of individual seismic records.

In accordance with the present invention a first set of seismic signals representative of reflections from each of a plurality of reflecting points along a first segment of a subsurface horizon are recorded on a seismogram with lateral spacings between the recordings thereof representative in scaled relation of the spacings between the subsurface reflecting points. Also recorded on the same seismogram are selected amplitude portions of a second set of signals representative of seismic waves reflected from points along a second segment of the subsurface reflecting horizon including at least one point from the first section with the spacings between the recordings of the second set of signals and the spacings between the first and second set of signals respectively representative of the spacing between the points of reflection on said subsurface horizon and the spacings between the first and second segments. A second seismogram is then produced including a record of the second set of seismic signals. The second seismogram may then be placed immediately beneath the margin of the first seismogram for registration of the recordings of signals reflected from the same subsurface points thereby to provide a continuous representation of seismic signals at the juncture between the records.

In a more specific aspect of the invention, there is provided a seismic recording system in which a recording chart is driven past a recording point at a predetermined speed. A plurality of galvanometers are directed to said recording point at laterally spaced positions at least one of which is disposed along the side of said chart and adjacent and beyond at least one margin thereof, and all of said positions are in scaled relation to the spacings between subsurface points of reflection of seismic waves. The galvanometers are then excited in dependence upon the reflected seismic waves as detected at surface detecting stations whereby complete representations of most of the signals will be recorded on the body of said chart. Adjacent said margin, only selected amplitude portions of certain of the signals will be recorded for registration with the corresponding signals on a second seismogram.

For a more complete understanding of the present invention and for further objects and advantages thereof, reference may now be had to the following description taken in conjunction with the accompanying drawings in which:

FIG. 1 diagrammatically illustrates the present recording method;

Figure 1:
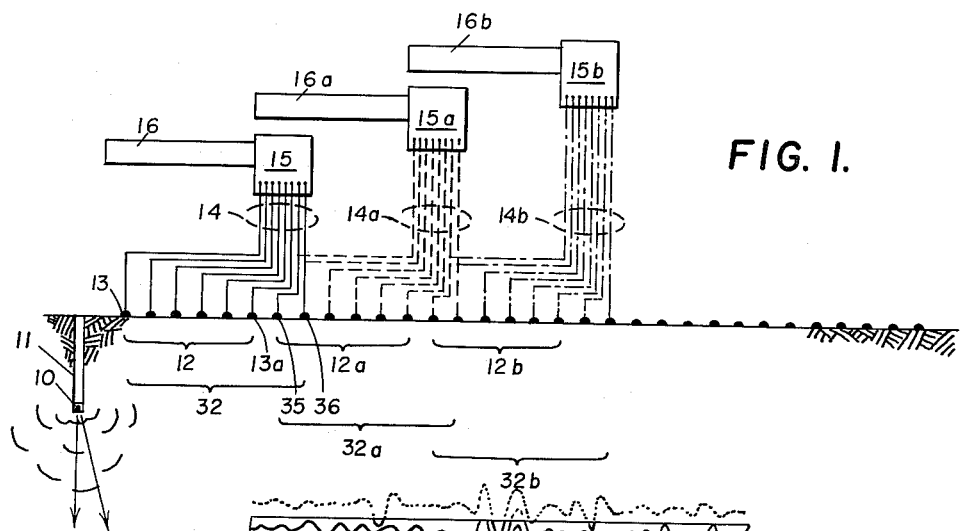

In FIG. 1 a seismic exploring system is illustrated as including a source 10 of seismic waves in a shot hole 11. A first seismic spread 12 includes six detectors spaced uniformly from each other with detector 13 a predetermined distance from borehole 11. The detectors forming spread 12 are connected by way of a multichannel cable 14 to a seismic recording system 15. For the purpose of illustration, a record or seismogram 16 has been illustrated as issuing from a recording system 15.

Figure 2:
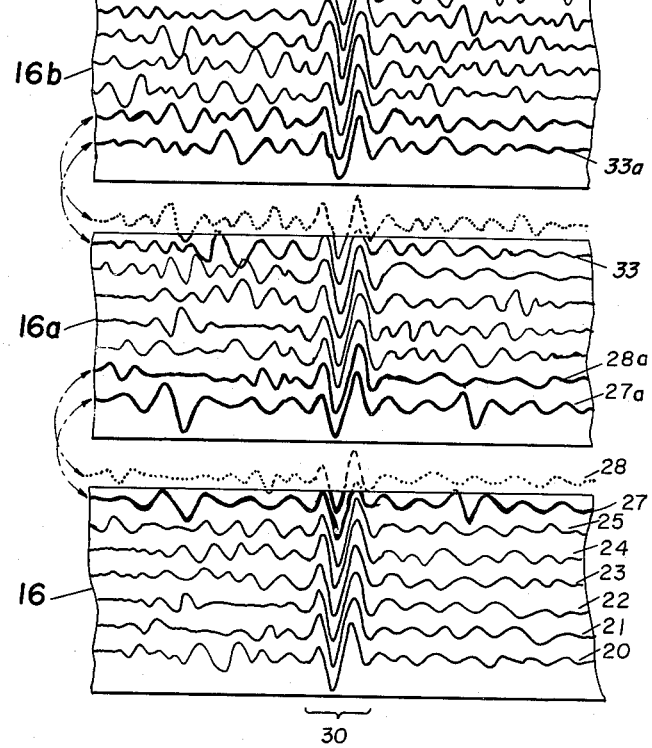
FIG. 2 illustrates a portion of the three seismograms of FIG. 1.

A portion of record 16 has been illustrated in enlarged form in FIG. 2. While various modes of treating the seismic signals detected in spread 12 are employed, it will be assumed that each of the traces 20–25, FIG. 2, are representative respectively of earth movement at detector 13 and at the detectors spaced at successively greater distances from shot hole 11. While six such traces (20–25) have been illustrated in FIG. 2, it will be understood that in conventional practice six or eight times as many traces may be recorded on a single photographic sheet to present seismic data from one spread.

In FIG. 2, the individual traces are characterized by high amplitude excursions representative of reflected energy or high amplitude noise. A reflection has been illustrated in record section 30. In order to record the entire wave, it is necessary to space the traces 20 and 25 representative of signals from the extreme geophones 13 and 13a a suitable distance from the margin of the recording paper. When such records are placed side by side in order to form a record cross section, there is an undesirable distortion in the section thus produced since the records must be spaced as to permit identity of all the traces thereon. Applicant has provided a recording system and method in which the spacing between all of the traces on an entire record section may be accurately scaled or proportioned to the spacing between points of reflection of seismic waves along a segment of a subsurface horizon. In the system of FIG. 1, such spacing is proportional to the spacing between the seismic detectors in spreads 12, 12a, and 12b.

In its broadest aspect the invention provides for recording on the same record, signals from detectors in the spread 12 along with signals from the adjacent spread 12a.

As illustrated, detectors in spread 12a are coupled through signal channels shown dotted and included in the cable 14a to a recorder 15a for the production of a record or seismogram 16a. Similarly detectors in a spread 12b are connected by cable 14b to a recorder 15b for the production of a record or seismogram 16b. Signals detected in the spread 32 will be recorded on record or seismogram 16. Similarly, signals detected in spread 32a will be recorded on seismogram 16a and signals detected in spread 32b will be recorded on seismogram 16b. In each case the top two traces, representative of signals from detectors in any spread most remote from the shot point 11, will be recorded at or near the upper margin of the record. For example, the output of detector 35 will be recorded as trace 27 on record 16. The output from detector 36 will be recorded only in part as indicated by curve 28. Curve 28 is shown dotted above the upper margin of record 16 and solid below said upper margin. All of the low amplitude components of the output of detector 35 appear as trace 27 on record 16. Only the high amplitude components of the output of detector 36 appear as trace 28 on record 16. Thus the curves or traces 27 and 28 on record 16 are discontinuous, since the traces 20–27 are asymmetrically disposed widthwise of the seismogram with the distances between the quiescent portions of traces 27 and 28 and the adjacent edge of the seisogram less than the maximum amplitude excursions of the signals of said traces.

The record 16a may be produced following the detonation of a second shot in shot hole 11. Record 16a includes traces 27a and 28a representative of signals from detectors 35 and 36, respectively. Thus the traces 27a and 28a of record 16a are both identical to traces 27 and 28 of record 16 and are continuous in character. The entire output of detector 36 is recorded on record 16a as trace 28a whereas only portions of the output of detector 36 are recorded on record 16 as trace 28.

By so recording signals from adjacent sections of a given traverse such as the traverse including spreads 32, 32a, and 32b, seismic records will be produced which may be laid one on top of the other without masking any portion of the recorded waves. More particularly, record 16 may be moved upwardly from the position shown in FIG. 2 to overlay record 16a to where trace 27 coincides with trace 27a. The portions of upward excursions of trace 27 that do not appear on record 16 will then appear on record 16a. The high amplitude portions of trace 28a which may be covered by record 16 are provided by the partial trace on record 16 so that a continuous presentation is thus available to an observer or computer.

In a similar manner signals from spread 32b will be recorded on record 16b and then moved into position such that the top trace 33 on record 16a directly overlays the bottom trace 33a on record 16b.

In practice records covering traverses having lengths of the order of several miles have been combined to present a clear composite picture of the seismic nature of subsurface formations.

In the foregoing discussion of the system of FIG. 1 and the records of FIG. 2 reference has been made to recording the outputs from the detectors in spreads 32, 32a, and 32b at points across a seismogram related to the spacings between such detectors. While this is the case in the system of FIG. 1, the significant point is that signals recorded as traces 27 and 28 should be reflected from the same subsurface reflecting points respectively as the signals recorded on traces 27a and 28a. The spacing between adjacent traces on the final seismogram should therefore be proportional to the spacing between points of reflection of seismic waves at a subsurface interface. In FIG. 1, by reason of the geometry between the source 10 and the detectors in the various spreads, the foregoing requirement automatically is satisfied. That is, since the same shot point is employed and the same detector locations are employed for producing signals recorded as traces 27 and 27a, 28 and 28a, the reflections necessarily are related to the same subsurface point. The geometry and field procedure shown in FIG. 1 is not as representative of the general case as is the system shown in FIG. 3.

Figure 3:
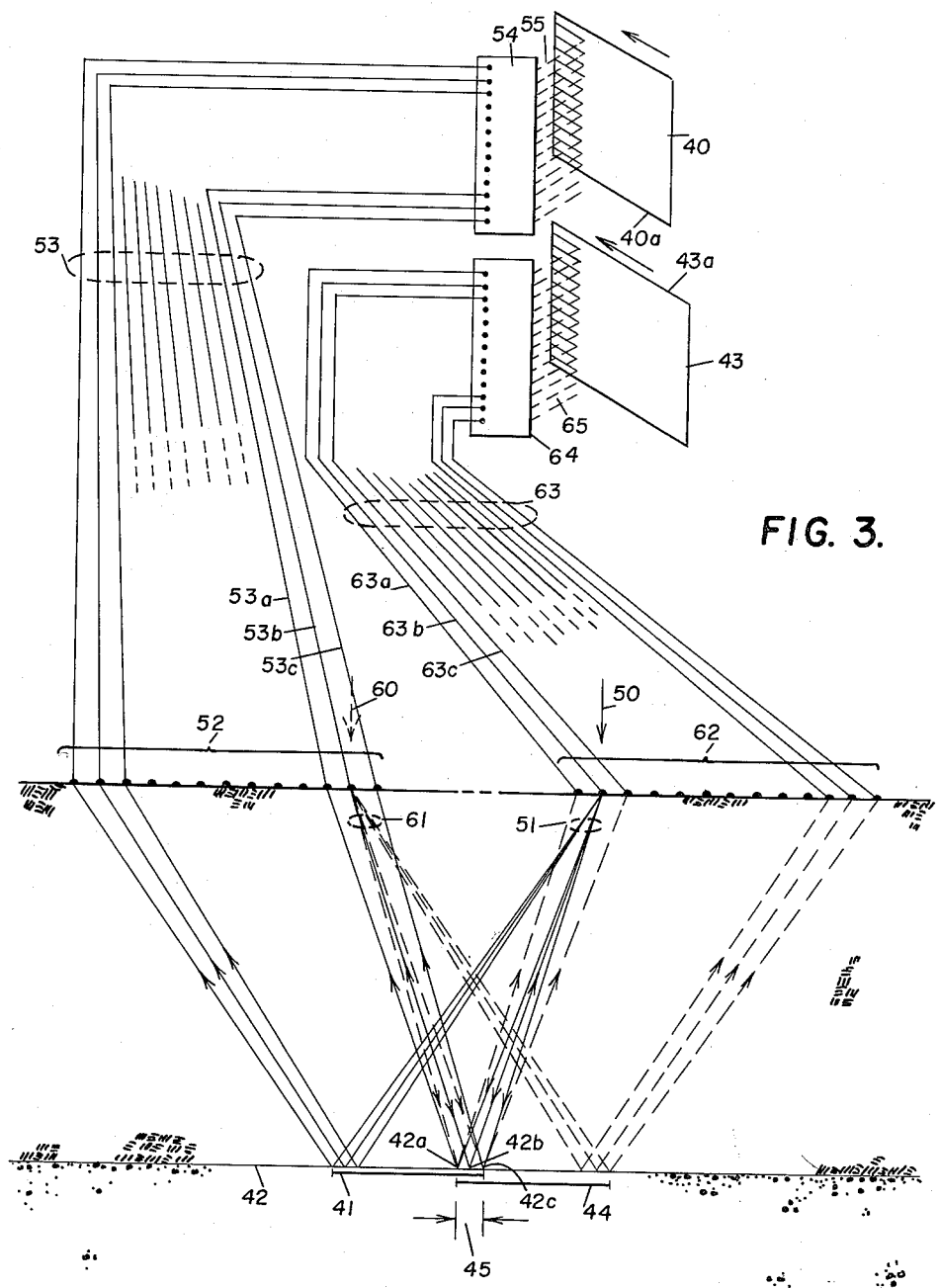
FIG. 3 illustrates one mode of field operation in accordance with the present invention.

FIG. 3 includes a seismic system which is utilized to secure a seismogram 40 for coverage of a segment 41 of a subsurface reflecting horizon 42. A second record 43 covering a segment 44 of a subsurface reflecting horizon 42 is also produced. A segment 45 of the subsurface horizon 42 is common to the two records 40 and 43.

More particularly, seismic waves are produced at a shot point located at a station represented by arrow 50. The seismic waves travel over ray paths 51 to the subsurface horizon 42 and are reflected at points along the segment 41. The reflected energy is then detected by seismometers positioned in a spread 52. For the purpose of simplicity ray paths which lead to the three detectors at each end of spread 52 have been shown. The detectors in spread 52 are connected by way of cable 53 to a recording system 54. The record 40 is then produced by projecting galvanometer light beams 55 onto photosensitive film. The galvanometer beams deflected in dependence upon signals from the geophones in spread 52 adjacent shot point 50 are directed so as to bracket the lower margin of record 40. The galvanometers coupled to the three geophones on the end of the spread 52 remote from shot point 50 are positioned in such a manner that their beams bracket the upper margin of record 40 in the manner generally explained in connection with FIGS. 1 and 2.

The second record 43 is produced following the generation of seismic waves at a shot point located at the position of arrow 60. The seismic waves traveling by way of ray paths 61 are reflected from subsurface horizon 42 at various reflecting points along the length of the segment 44. Reflected signals are then detected at the earth's surface by seismometers positioned in a spread 62. Again, ray paths have been illustrated as extending only to the three seismometers at the ends of the spread 62. The seismometers in spread 62 are connected by cable 63 to recording unit 64. The record 43 is then produced by projecting galvanometer light beams 65 onto a photosensitive film. The signals from the geophones in spread 62 adjacent shot point 60 are recorded as to bracket the upper margin of record 43. The signals from the geophones on the end of the spread 62 remote from shot point 60 are recorded as to bracket the lower margin of record 43.

It will now be apparent that signals on channels 53a and 63a represent reflections from the same point, namely, point 42a on the subsurface horizon 42. Similarly signals on channels 53b and 63b include seismic waves reflected from point 42b on subsurface horizon 42. Signals on channels 53c and 63c include seismic waves reflected from point 42c on subsurface reflecting horizon 42. The signals on channels 53a, 53b and 53c and 63a, 63b and 63c are common at least in full or in part to both of records 40 and 43 so that they may be overlapped at margins 40a and 43a without obscuring any portion of any of the signals.

The use of the system above described may form a part of a seismic exploration program of the type known as "skip-continuous shooting" or similar procedures such as described under the heading "Continuous Coverage" in Introduction to Geophysical Prospecting by Dobrin, beginning at page 257. It is preferred that in connection with such a program the signals detected in spreads 52, 62, etc. be recorded in phonographically reproducible form so that they may be filtered, corrected for spread geometry, weathering and other such factors before a final photographic record is produced. It should be understood that the term "phonographically reproducible" as used herein shall be given the same meaning as in Patent No. 2,051,153 to Rieber. Seismic signals recorded in accordance with the present invention have proven particularly advantageous in connection with expanding spread techniques such as illustrated and described in applicant's copending application Serial No. 613,117, filed October 1, 1956, for Seismic Exploration With Multiple Elimination, now abandoned.

Figure 4:
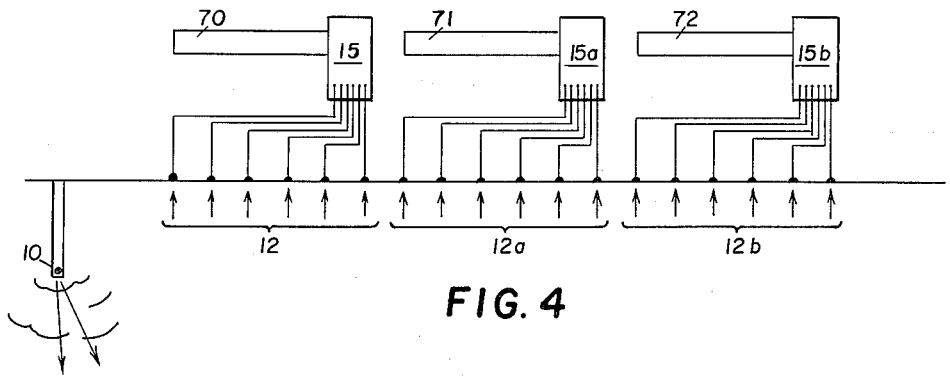
FIG. 4 illustrates a modification of the invention.

Operations based upon phonographically reproducible recording are illustrated in FIGS. 4–8. Referring to FIG. 4, like parts have been given the same reference characters as in FIG. 1. Signals detected in spread 12 and applied to recorder 15 are impressed on a phonographically reproducible record 70. Similarly, signals detected in spread 12a are applied to recorder 15a and impressed on a phonographically reproducible record 71, and signals detected in spread 12b are applied to recorder 15b and impressed on a phonographically reproducible record 72. Such records may be made simultaneously and include seismic energy produced by the detonation of source 10 or may be made following detonation of successive charges.

Figures 5, 6:
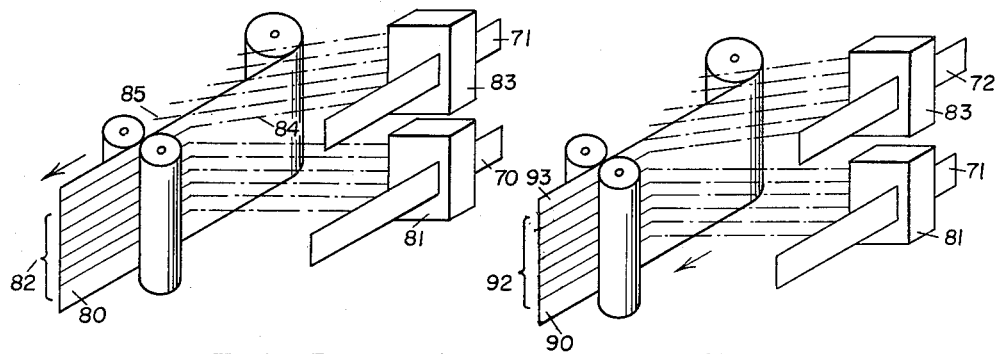
FIGS. 5 and 6 illustrate operations involving the records of FIG. 3.

Referring now to FIG. 5, records 70 and 71 are employed to produce a photographic or visual record 80 by passing record 70 through a seismic treating and recording unit 81. Light beams reflected from output galvanometers of conventional type are focused onto photographic film 80 to form six traces 82. Record 71 is passed through a similar treating and recording device 83 to produce output signals in the form of light beams from galvanometers which are focused on the upper portion of record 80 and thereabove. More particularly, the light beam 84 will be focused to a quiescent point normally on record 80 and spaced from the uppermost of the traces 82 a distance proportional to the distance between the adjacent geophones in spreads 12 and 12a, FIG. 4. The beam 85 is focused on a quiescent point above record 80 and spaced from the quiescent point of ray 84 a distance proportional to the spacing between the first two detectors in spread 12a. With the speed of the records 70, 71 and 80 suitably synchronized, the signals on record 70 may be recorded in their entirety on record 80. Selected amplitude portions of the signals on record 71 will be recorded at or near the upper margin of the record 80.

Following production of record 80, a second record may be provided as shown in FIG. 6 by passing record 71 through the recording and treating system 81 with the output therefrom recorded on the traces 92 of seismogram 90. Signals from the detector in spread 12b adjacent spread 12a will be recorded as the upper trace 93 on record 90 and selected amplitude portions of the succeeding signals similarly may appear near the upper margin of record 90. By synchronizing travel of record 90 and the reproducible records 71 and 72, a new chart or seismogram 90 may be produced which may be combined with record 80 in the production of a record section.

Figures 7, 8:
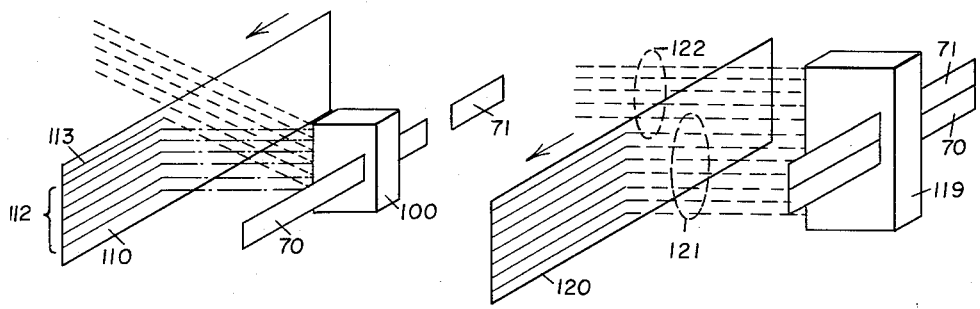
FIGS. 7 and 8 illustrate further modifications of the invention.

In FIG. 7 where a single reproducing system 100 is employed record 70 is first passed through the treating-recording system 100 to record the seismic signals on record 70 as traces 112 on record 110. Thereafter the reproducible record 71 will be passed through the treating unit 100. Concurrently therewith the record 110 is driven past the recording point. During this recording period the output galvanometers from unit 100 are focused upward so that the bottom galvanometer trace will impinge the top of record 110 to produce trace 113. The remaining galvanometer outputs are focused at succeedingly higher positions so that only selected amplitude portions of record 71 will be recorded at or near the upper margin of record 110.

In FIG. 8 there is illustrated a system in which records 70 and 71 occupy adjacent segments on the same recording medium as might be the case where a multi-channel magnetic recording device is employed in the field. Where the photographic record will not accommodate all signals recorded on records 70 and 71, a first record 120 may be produced by applying the combined records 70 and 71 to a treating-recording unit 119 and recording signals represented by the rays 121 thereon. On a succeeding recording operation the signals represented by the rays 122 will be recorded on a second seismogram to provide records suitable for section manipulations.

The description of FIGS. 1, 2, and 4–8 has been based primarily upon the premise that a six trace seismogram may form the basis of operations, but it should be appreciated that the invention is applicable to modifications all consonant with present day practices. The latter include use of multiple detectors for the production of each individual signal ultimately recorded, complex phonographic recording and playback techniques, and various shot-spread geometries. The applicability of the invention to such operations will be apparent from consideration of the foregoing description which for the purpose of clarity has been limited to relatively simple seismic systems. It is intended to cover all such modifications as fall within the scope of the appended claims.

What is claimed is:

1. In seismic exploration where a plurality of seismograms having the same time base are to be combined in side-by-side relation to form a seismic cross section, the method which comprises recording a plurality of seismograms each including a plurality of transversely spaced variable amplitude traces from signals respectively representative of seismic waves reflected from a series of reflection points spaced along a subsurface reflecting horizon with each pair of said seismograms each having along selected margins thereof one trace representative of signals from the same point on said horizon, arranging as a group on each of said seismograms the relative positions of their traces so that said one trace of each of said pairs of traces is spaced from the margin of its seismogram a distance less than the maximum amplitude of excursion of that trace to provide along said last-mentioned margin a discontinuous trace while the corresponding trace of the other one of each of said pairs of seismograms is spaced from the margin of its seismogram a distance greater than the maximum amplitude of the excursion of that trace to provide along said last-mentioned margin a continuous trace, and placing the seismograms in side-by-side relation with one of said seismograms of each said pair over the other seismogram of the corresponding pair with said discontinuous trace overlapping the corresponding portion of said continuous trace to form a single trace common to each pair of seismograms thereby to form ties between successive pairs of seismograms in establishment of a seismic cross section which is continuous from seismogram to seismogram with the traces thereof in number corresponding with and representative of said reflection points spaced along said subsurface reflecting horizon.

2. The method of claim 1 in which the plurality of traces on said seismograms are so arranged relative to a margin thereof that an additional trace is discontinuous, which additional trace is adjacent said first-named discontinuous trace.

References Cited in the file of this patent
UNITED STATES PATENTS

| | | |
|---|---|---|
| 2,539,220 | Athy | Jan. 23, 1951 |
| 2,710,070 | Merten | June 7, 1955 |
| 2,710,661 | Webster | June 14, 1955 |
| 2,743,785 | Lee | May 1, 1956 |
| 2,767,389 | McCollum | Oct. 16, 1956 |
| 2,937,915 | Peterson | May 24, 1960 |